United States Patent
Kokku et al.

(10) Patent No.: US 10,832,584 B2
(45) Date of Patent: Nov. 10, 2020

(54) PERSONALIZED TUTORING WITH AUTOMATIC MATCHING OF CONTENT-MODALITY AND LEARNER-PREFERENCES

(71) Applicant: International Business Machines Corporation, Armonk, NY (US)

(72) Inventors: Ravindranath Kokku, Yorktown Heights, NY (US); Satyanarayana V. Nitta, Cross River, NY (US); Sharad C. Sundararajan, Weehawken, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 293 days.

(21) Appl. No.: 15/849,458

(22) Filed: Dec. 20, 2017

(65) Prior Publication Data

US 2019/0189022 A1 Jun. 20, 2019

(51) Int. Cl.
*G09B 7/00* (2006.01)
*G09B 5/12* (2006.01)
(Continued)

(52) U.S. Cl.
CPC ............. *G09B 5/12* (2013.01); *G06F 16/252* (2019.01); *G09B 5/065* (2013.01); *G09B 7/00* (2013.01)

(58) Field of Classification Search
CPC .................................. G09B 7/00; G09B 7/07
See application file for complete search history.

(56) References Cited

U.S. PATENT DOCUMENTS 8,628,331 B1 * 1/2014 Wright .................. G09B 19/00
434/107
9,477,757 B1 * 10/2016 Ning ..................... G06F 16/951
(Continued)

FOREIGN PATENT DOCUMENTS

| WO | 0203354 A2 | 1/2002 |
| WO | 2014127241 A1 | 8/2014 |
| WO | 2015047424 A1 | 4/2015 |

OTHER PUBLICATIONS

Zhang et al., "Study and Application of Agent in Personalized Tutoring System," 2009 International Conference on Environmental Science and Information Application Technology (ESIAT), vol. 3, Jul. 2009, pp. 150-153, IEEE Computer Society.
(Continued)

*Primary Examiner* — James S. McClellan
(74) *Attorney, Agent, or Firm* — Daniel P. Morris, Esq.; Hoffmann & Baron, LLP

(57) ABSTRACT

An embodiment includes a method for use in presenting a plurality of concepts to a plurality of students. The method includes developing a first statistical model of one or more modalities effective for teaching at least a given concept of the plurality of concepts across the plurality of students. The method also includes developing a second statistical model of one or more modalities effective for learning by at least a given student of the plurality of students across the plurality of concepts. The method further includes combining the first and second models to determine one or more modalities for presenting at least the given concept to at least the given student; and presenting at least the given concept to at least the given student using the determined one or more modalities.

19 Claims, 7 Drawing Sheets

(51) Int. Cl.
    *G09B 5/06*          (2006.01)
    *G06F 16/25*       (2019.01)

(56) References Cited

U.S. PATENT DOCUMENTS

| | | |
|---|---|---|
| 2003/0003433 A1 | 1/2003 | Carpenter et al. |
| 2007/0269775 A1 | 11/2007 | Andreev et al. |
| 2008/0038708 A1 | 2/2008 | Slivka et al. |
| 2010/0273138 A1 | 10/2010 | Edmonds et al. |
| 2011/0065082 A1 | 3/2011 | Gal et al. |
| 2011/0070573 A1* | 3/2011 | Dennis .............. G09B 5/00 434/433 |
| 2012/0276514 A1* | 11/2012 | Haimowitz .......... G09B 7/04 434/350 |
| 2014/0279727 A1* | 9/2014 | Baraniuk ............ G06N 20/00 706/11 |
| 2014/0342336 A1 | 11/2014 | Kapoor |

OTHER PUBLICATIONS

Xiaoqiong et al., "Personalized Teaching Model Based on Moodle Platform," Ch. 4, pp. 27-35, in Z. Zhong (eds), "Proceedings of the International Conference on Information Engineering and Applications (IEA) 2012," Springer, Lecture Notes in Electrical Engineering (LNEE) 216, vol. 1.
The College Board, "AP Physics Special Focus—Multiple Representations of Knowledge: Mechanics and Energy," 2008, pp. 1-60, http://apcentral.collegeboard.com/apcipublic/repository/Physics_Multiple_Representations_of_Knowledge_SF.pdf.

* cited by examiner

130

PERSONALIZED TUTORING WITH AUTOMATIC MATCHING OF CONTENT-MODALITY AND LEARNER-PREFERENCES

BACKGROUND

The present invention relates to the electrical, electronic and computer arts, and, more particularly, to computer-assisted personalized education.

Education content can be taught using various modalities (e.g., representations or formats). These modalities may include, for example, text, images, audio, video, animation, interactives, tangibles, and augmented/virtual reality. These modalities may also include examples and formalism, experimentation and experience, or contextual and conceptual connections.

Using only one modality is inappropriate from both learner and content perspectives. Not every concept can be taught in a given modality. Different learners may prefer to learn using different modalities. In conventional approaches, content creation and modality selection are decoupled and ad hoc. Content modality is adapted based solely on user (e.g., learner) preferences.

SUMMARY

An embodiment of the present invention includes a method for use in presenting a plurality of concepts to a plurality of students. The method includes developing a first statistical model of one or more modalities effective for teaching at least a given concept of the plurality of concepts across the plurality of students. The method also includes developing a second statistical model of one or more modalities effective for learning by at least a given student of the plurality of students across the plurality of concepts. The method further includes combining the first and second models to determine one or more modalities for presenting at least the given concept to at least the given student; and presenting at least the given concept to at least the given student using the determined one or more modalities.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Rather than just making content available, exemplary embodiments of the present invention provide multi-modal content customization for each student likely to help that student learn. Highly personalizing content according to exemplary embodiments of the present invention advantageously provides better learning outcomes and greater student retention.

These and other features and advantages of the present invention will become apparent from the following detailed description of illustrative embodiments thereof, which is to be read in connection with the accompanying drawings.

BRIEF DESCRIPTION OF THE DRAWINGS

FIG. 1A shows an exemplary static presentation of the contour map, suitable for use with an illustrative embodiment of the present invention;

FIG. 1B shows an exemplary interactive presentation of the contour map, suitable for use with an illustrative embodiment of the present invention;

FIG. 1C shows an exemplary augmented reality presentation of the contour map, suitable for use with an illustrative embodiment of the present invention;

FIG. 2A shows an exemplary scatter plot presentation of the mathematics problem, suitable for use with an illustrative embodiment of the present invention;

FIG. 2B shows an exemplary bar graph presentation of the mathematics problem, suitable for use with an illustrative embodiment of the present invention;

DETAILED DESCRIPTION

Figure 1A:
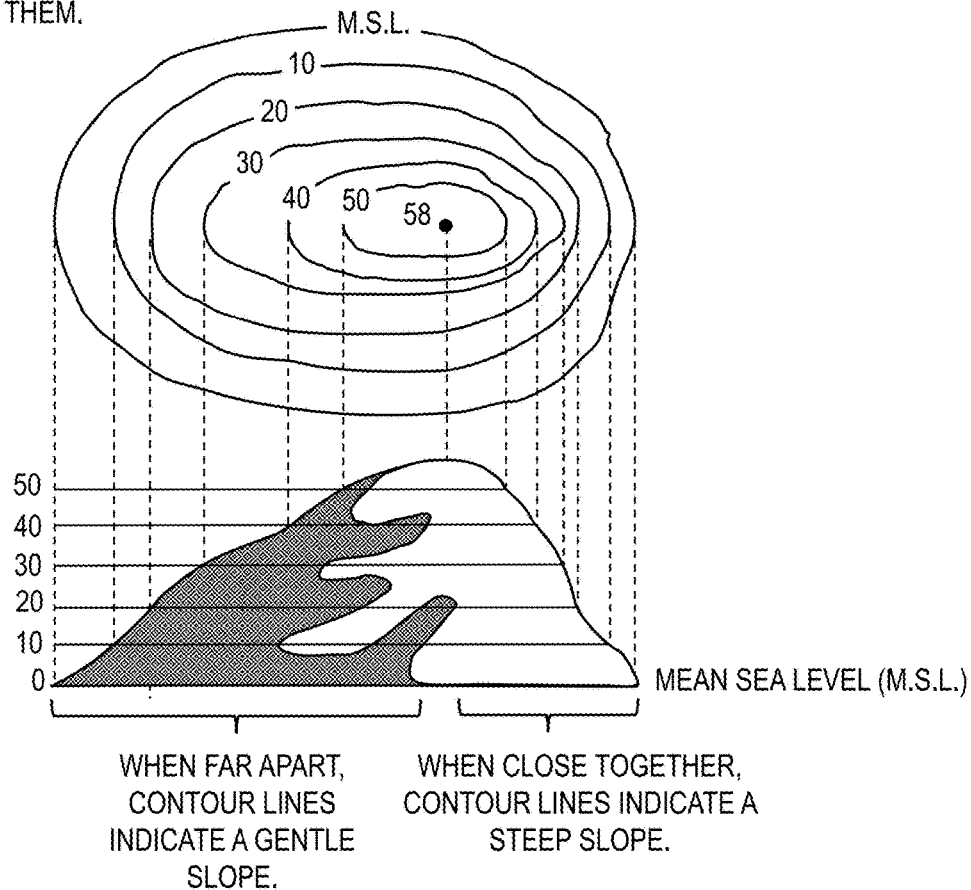
FIGS. 1A-1C show an exemplary contour map using different modalities, suitable for use with an illustrative embodiment of the present invention.
Figure 1B:
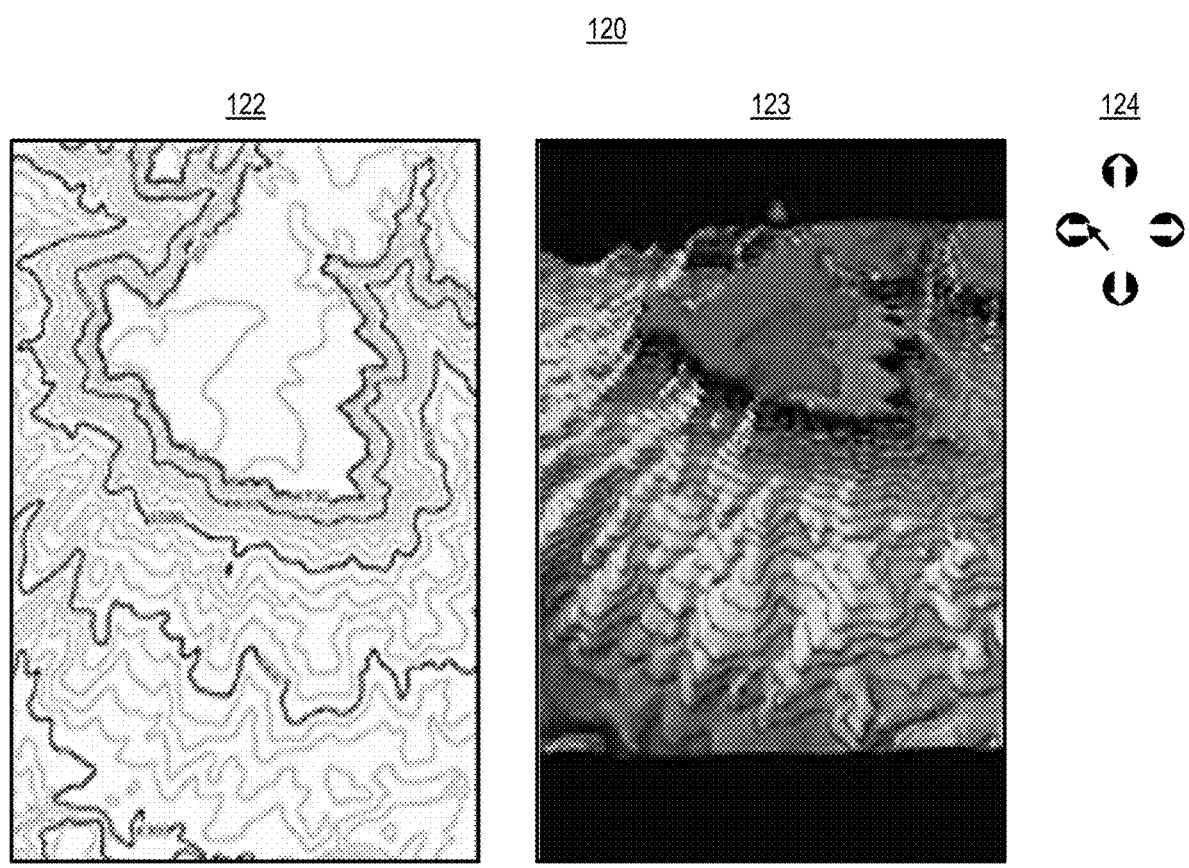
Figure 1C:
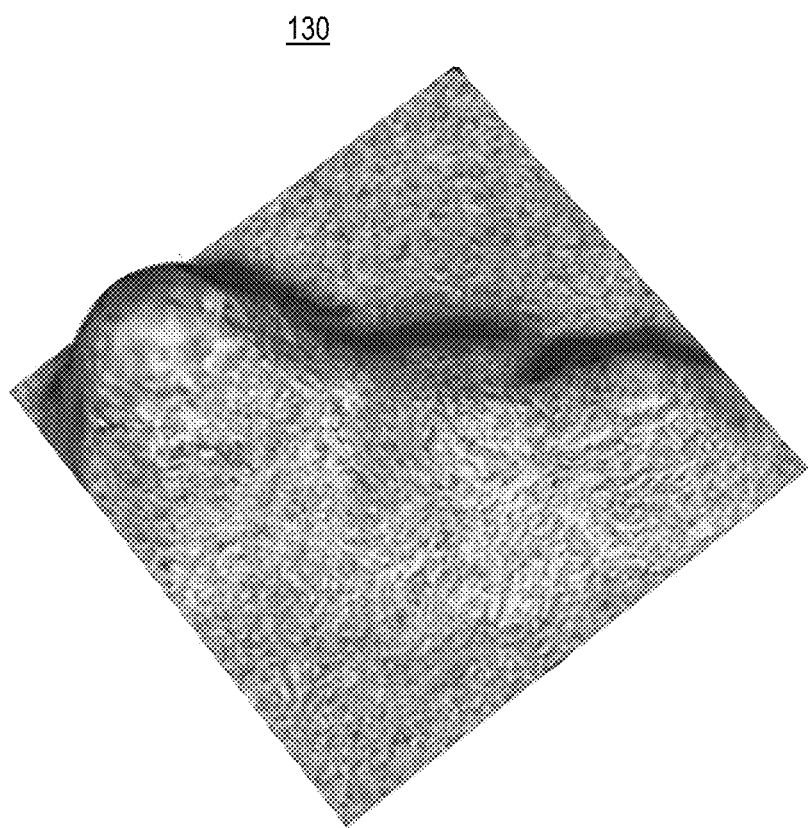

A given concept can often be taught using a variety of different modalities. For example, within the subject of Earth Science, and more particularly topography, a contour map may be explained using various modalities, a subset of which are shown in FIGS. 1A-1C. FIG. 1A shows a static presentation 110, comprising images and accompanying textual description. FIG. 1B shows an interactive presentation 120, including a two-dimensional representation 122, a three-dimensional representation 123, and user controls 124. FIG. 1C shows an augmented reality (AR) presentation 130. These modalities require different student skill sets, an example of which is shown in Table 1 below.

TABLE 1

| Required Skill | Static Image 110 | Interactive 120 | AR 130 |
|---|---|---|---|
| Background (prerequisites) | Strong | Strong | Weak |
| Abstract Thinking | Strong | Strong | Not Needed |
| Spatial Reasoning | Moderate | Weak | Weak |
| Social/Collaborative Learning | N/A | N/A | Desired |

As shown in Table 1, a student with weak spatial reasoning may learn more effectively using an interactive display 120 or augmented reality 130. On the other hand, a student with moderate spatial reasoning may learn more effectively using static image 110. Augmented reality 130 may be the most suitable option for a student with a weak subject matter background (e.g., lacking prerequisites) or weak abstract thinking. Augmented reality 130 may also be preferred by a student desiring social and/or collaborative learning, regardless of skills.

As another further example, a mathematics problem may be represented using various modalities. For example, a textual (word) description of a problem may be: "Suppose we have some test data for two programs: Program A and Program B. Both programs had 20 unique participants. The average test score for each program is 13.45." This textual description does not provide much information, and students might be tempted to incorrectly conclude performance on both programs is equivalent. A numeric description of the same problem shown in FIG. 2 below:

TABLE 2

| Program | Count (n) | Mean (m) | Scores (raw data) |
|---|---|---|---|
| Program A | 20 | 13.45 | 11, 15, 14, 15, 18, 16, 17, 12, 11, 13, 15, 13, 16, 14, 13, 9, 16, 10, 11, 10 |
| Program B | 20 | 13.45 | 20, 18, 18, 17, 19, 18, 5, 7, 8, 9, 6, 16, 7, 8, 19, 20, 17, 8, 9, 20 |

Figure 2A:
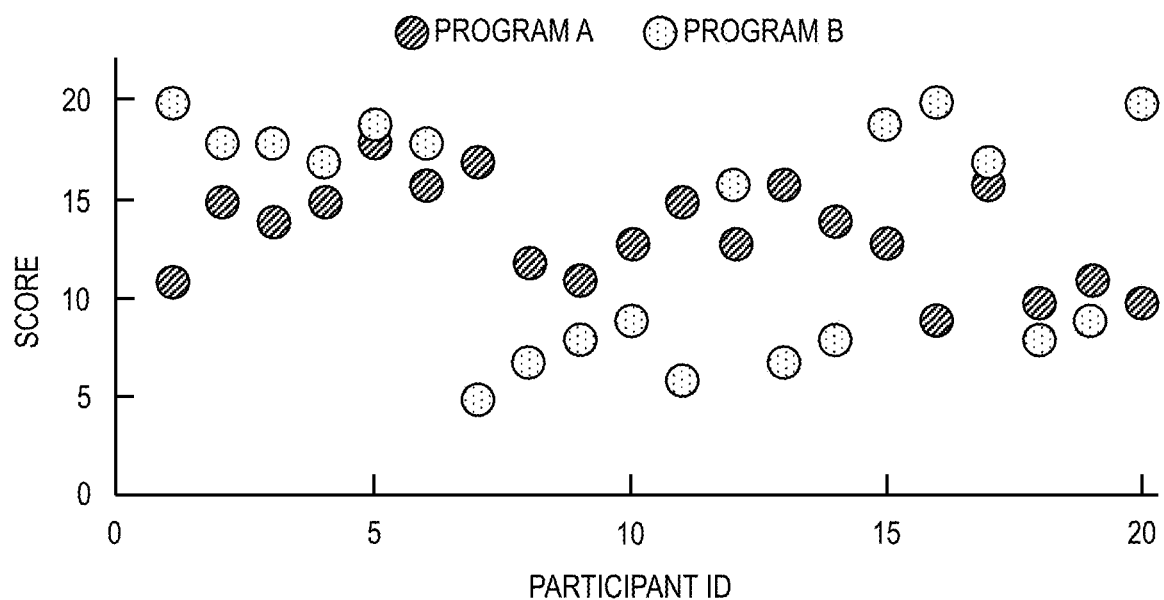
FIGS. 2A-2B show an exemplary mathematics problem using different modalities, suitable for use with an illustrative embodiment of the present invention.
Figure 2B:
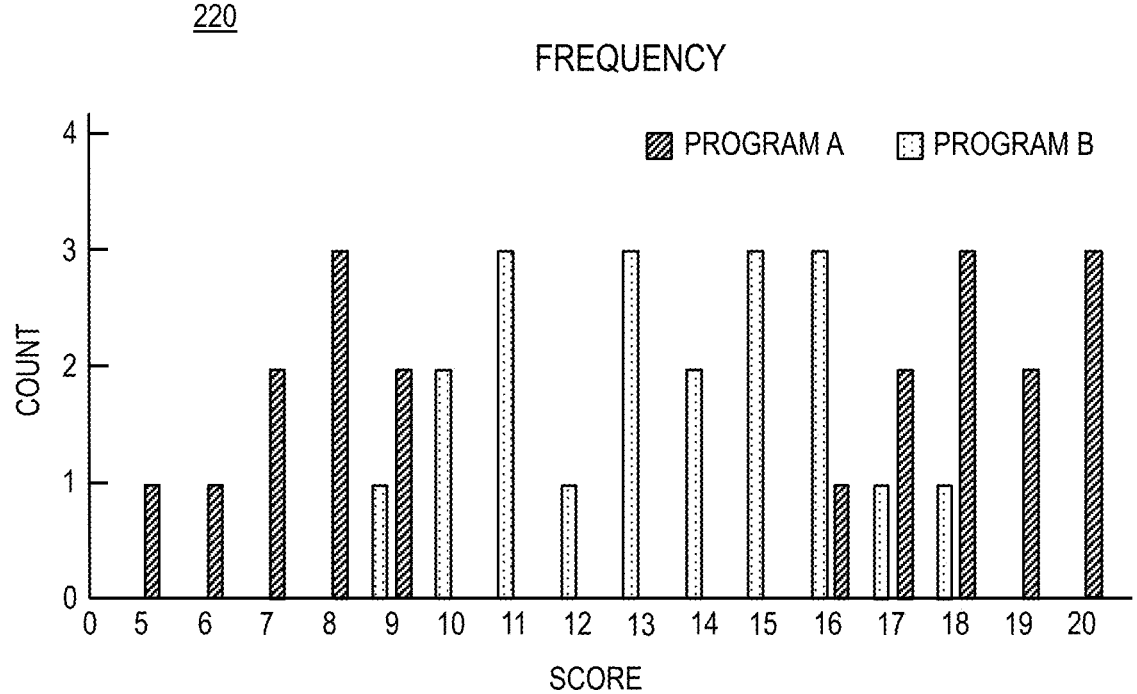

The numerical description shown in Table 2 above provides more information than the aforementioned textual description, but it is still difficult for a human to make sense of the raw data when presented as a list of numbers. FIGS. 2A and 2B show graphical presentations of the aforementioned problem.

FIG. 2A shows a scatter plot 210, in which the darker (crosshatched) circles represent Program A and the lighter (dotted) circles represent Program B. Scatter plot 210 shows an approximate range, from which a student can estimate guesses based on visual cues, such as shading, spacing, and position. Scatter plot 210 indicates that most participants in Program A have scores in a middle range, while most participants in Program B have either relatively low or relatively high scores.

FIG. 2B shows a bar chart 220, in which the darker (crosshatched) bars represent Program A and the lighter (dotted) bars represent Program B. Bar chart 220 shows an exact count for each score. Bar chart 220 illustrates why the average for each program is identical, despite the programs being different: there are two distinct groups in Program B (high scorers and low scorers), but only one big group in Program A (middle scorers).

Figure 3:
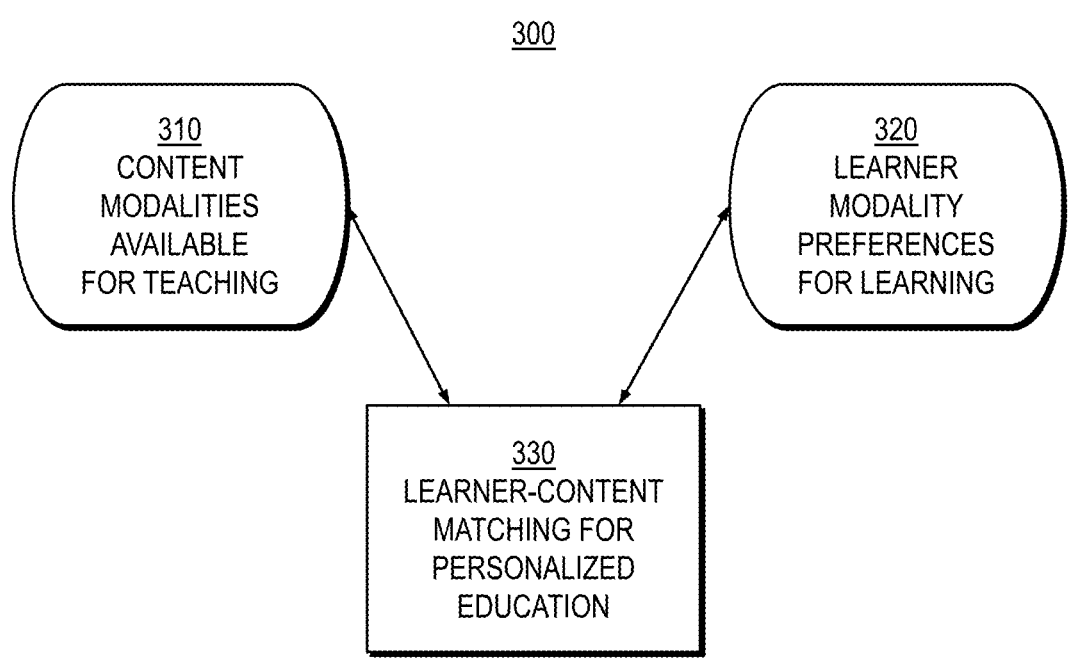
FIG. 3 shows a simplified overview of an illustrative embodiment of the present invention.

FIG. 3 shows a simplified overview of an illustrative embodiment of the present invention. An illustrative embodiment combines content modalities available for teaching 310 and learner modality preferences for learning 320 to provide learner-content matching for personalized education 330. In other words, an illustrative embodiment includes combining models of content modality 310 and learner preferences 320 into an automated way of personalizing teaching 330. That is to say, an illustrative embodiment uses a combination 330 of user learning-modality model 320 and content teaching-modality model 310.

An illustrative embodiment includes automatically selecting the best modality (or ranked set of modalities) for presentation of a piece of education content (e.g., concept), customized for a particular student, based on: a statistically ratified model 310 of the most effective way(s) of teaching the piece of content, a statistically determined model 320 of the most effective way(s) of learning for the particular student. An illustrative embodiment includes a metric 330 that combines the two models 310 and 320 and ranks the best order of modalities in which the piece of content can be taught to the particular student.

As shown by the double-headed arrows in FIG. 3, an illustrative embodiment may also include continuously updating models 310 and 320 based on results of the personalized education 330, such as user feedback or test scores. Thus, after bootstrapping by matching 330 an initial list of content modalities 310 to learning preferences 320, the progress of the student in learning the concept (e.g., measured by intermediate assessments) can be used for updating the teaching modality model 310 and the learning modality model 320, thereby changing the modality of content presentation 330 based on the evolving understanding of the student. An illustrative embodiment may apply machine learning based on statistical analysis, e.g. of longitudinal data, to provide a continuously updated modality selection 330 based on updated models 310 and 320.

Figure 4:
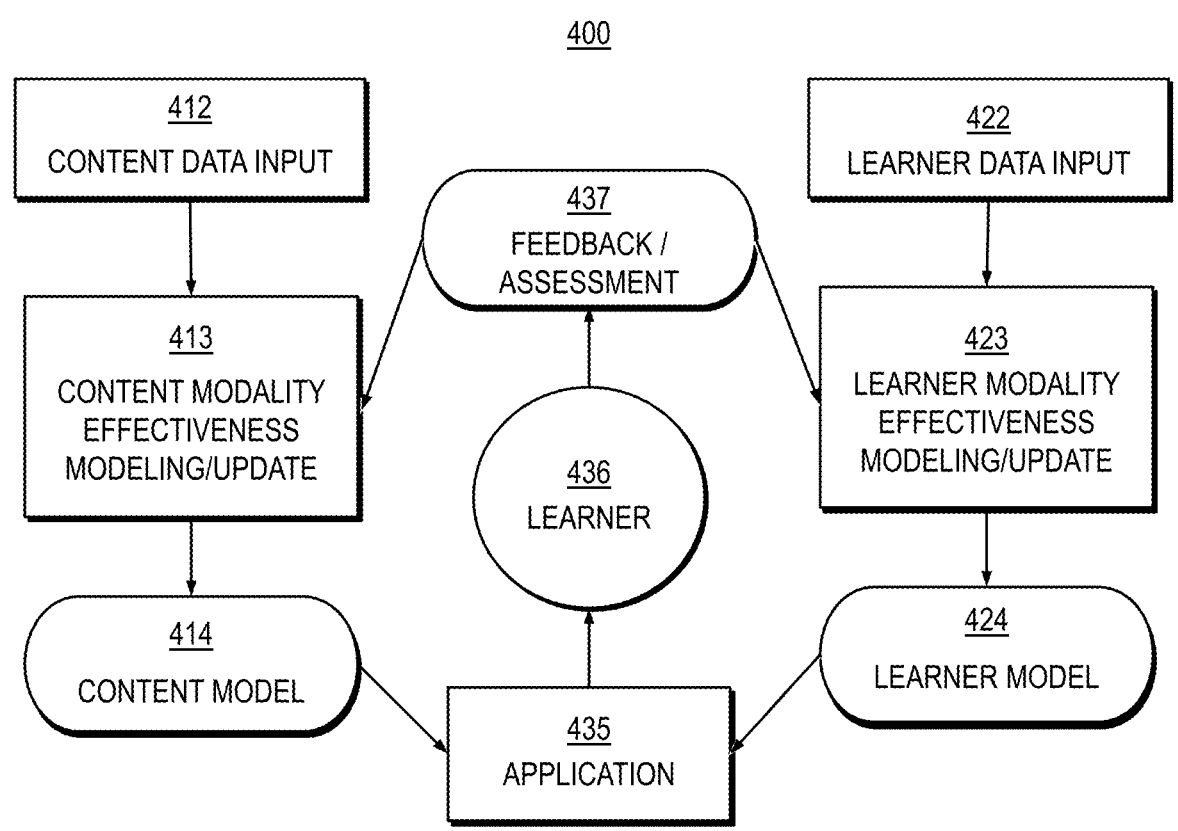
FIG. 4 shows one or more aspects and/or elements of an illustrative embodiment of the present invention.

FIG. 4 shows a more detailed representation of an illustrative embodiment of the invention. Generally speaking, element 310 in FIG. 3 corresponds to elements 412, 413 and 414 in FIG. 4, element 320 in FIG. 3 corresponds to elements 422, 423 and 424 in FIG. 4, and element 330 in FIG. 3 corresponds to elements 435, 436 and 437 in FIG. 4. An embodiment typically begins with content data input 412 and learner data input 422.

Content data input 412 may involve iterative content generation, refinement, and tagging, for instance. For each concept, an entity (e.g., content creator, school teacher, or student/learner) can create an exposition in a given modality, tag attributes, and identify the background concepts. The background concepts can include, for example, analogies, related concepts, or prerequisites. Content data input 412 could be crowdsourced in a continuous manner, or obtained at least in part from a learning concept store. The tagging of content can be done iteratively through automated analysis or manual refinement as the content is consumed. The automated analysis can be further fed with comments and ratings provided by users of the content. Content data input 412 may also include standardizing exposition modalities to semantic concepts.

Learner data input 422 may include constructing conceptual learning models from learning modalities. In one embodiment, the system bootstraps with initial learner preferences based on inputs from content creators. In another embodiment, learner data input 412 includes longitudinal information from a student information hub and/or learner database. Learner models and preferences can be automatically learned through a variety of ways, including, but not limited to, a longitudinal analysis of system usage, a set of explicitly designed activities and assessments, or through explicit specification by the user.

Content modality effectiveness modeling 413 involves using content data input 412 to generate content model 414.

Content model 414 may include a statistically ratified model of the most effective modalities for teaching a given piece of content (e.g., concept). Effectiveness can be captured in a multi-dimensional matrix of the form $f$(Concept, Modality, LearnerPref) and/or $f$(Concept, Modality, LearnerPref, BGConcept)

The function $f$ aggregates effectiveness of a modality for a given LearnerPref for a concept across multiple learners and content pieces. The function can additionally use the background concepts (BGConcept) known by the learner to select modality. The content for each modality of teaching is provided by a content owner, and the background concept for each concept are provided in a cross-disciplinary concept graph. The matrix can then be learned based on exposition of concepts to learners.

Learner modality effectiveness modeling 423 involves using learner data input 422 to generate learner model 424. Learner model 424 may include a statistically determined model of the most effective modalities of learning for a particular student/learner. Learner model 424 may be of the form (Learner, Modality, BGConcept). Learner model 424 is maintained as a simple histogram where (Concept, Modality)=1 if that modality is effective for that concept for this particular learner. Then, concepts are clustered to domains, and a histogram of modality effectiveness is generated for each domain. For example, for a given learner L, mechanics may be best explained through formalism, whereas optics is best explained through experiments, electricity through examples, etc.

Application 435 involves automatically selecting the best modality (or ranked set of modalities) for presentation of a piece of education content (e.g., concept), customized for a particular student/learner. An illustrative embodiment may compute a metric that combines the two models 414 and 424 and ranks the best order of modalities in which the piece of content can be taught to the particular student/learner.

Application 435 may include identifying for a given learner, based on his/her preference and the concept, the best modality for exposing the content based on simple to semantic matching. Semantic matching may include mapping to known concepts, and finding the percentage overlap of the concepts between the content model 414 and the user learning model 424. Application 435 may also include determining a relative order of modalities in which the concept is presented for consumption. Application 435 may also include recommending, for a given concept, what modality of expression should be developed further by a content provider to reduce learner's overall time. Application 435 may also involve learning previously missed concepts that a prerequisite to a current concept, irrespective of the time (or age) when the concepts are learned.

Thus, application 435 presents content to learner 436 (e.g., user or student) using the modality or modalities determined to be optimal for that particular content and that particular learner. Application 435 may also include monitoring usage (e.g., for longitudinal analysis), sanitizing content, and/or providing incentives to learner 436.

After the content is presented, feedback and/or assessment 437 may be obtained from the user. For example, a learner 436 may provide subjective feedback whether the modality was effective. Objective data of effectiveness may be obtained through an assessment (e.g., test or quiz) measuring the learner's understanding of the concept. Feedback/assessment 437 may be used to update the content model 414 and the learning model 424. Content modality effectiveness may be updated 413 based on the feedback/assessment 437, as well as content input data 412 (including content input data received after the content model was generated and/or updated), to produce an updated content model 414. Learner modality effectiveness may be updated 423 based on the feedback/assessment 437, as well as learner input data 422 (including content input data received after the learner model was generated and/or updated), to produce an updated learner model 414.

Given the discussion thus far, it will be appreciated that, in general terms, an embodiment of the invention includes a method (e.g., 300 in FIG. 3 and/or 400 in FIG. 4) for use in presenting a plurality of concepts to a plurality of students. The method includes developing a first statistical model of one or more modalities effective for teaching at least a given concept of the plurality of concepts across the plurality of students (e.g., 310 in FIG. 3 and/or 413 and 414 in FIG. 4). The method also includes developing a second statistical model of one or more modalities effective for learning by at least a given student of the plurality of students across the plurality of concepts (e.g., 320 in FIG. 3 and/or 423 and 424 in FIG. 4). The method further includes combining the first and second models to determine one or more modalities for presenting at least the given concept to at least the given student; and presenting at least the given concept to at least the given student using the determined one or more modalities (e.g., 330 in FIG. 3 and/or 435 in FIG. 4).

One or more embodiments of the invention, or elements thereof, can be implemented, at least in part, in the form of an apparatus including a memory and at least one processor that is coupled to the memory and operative to perform exemplary method steps.

Figure 5:
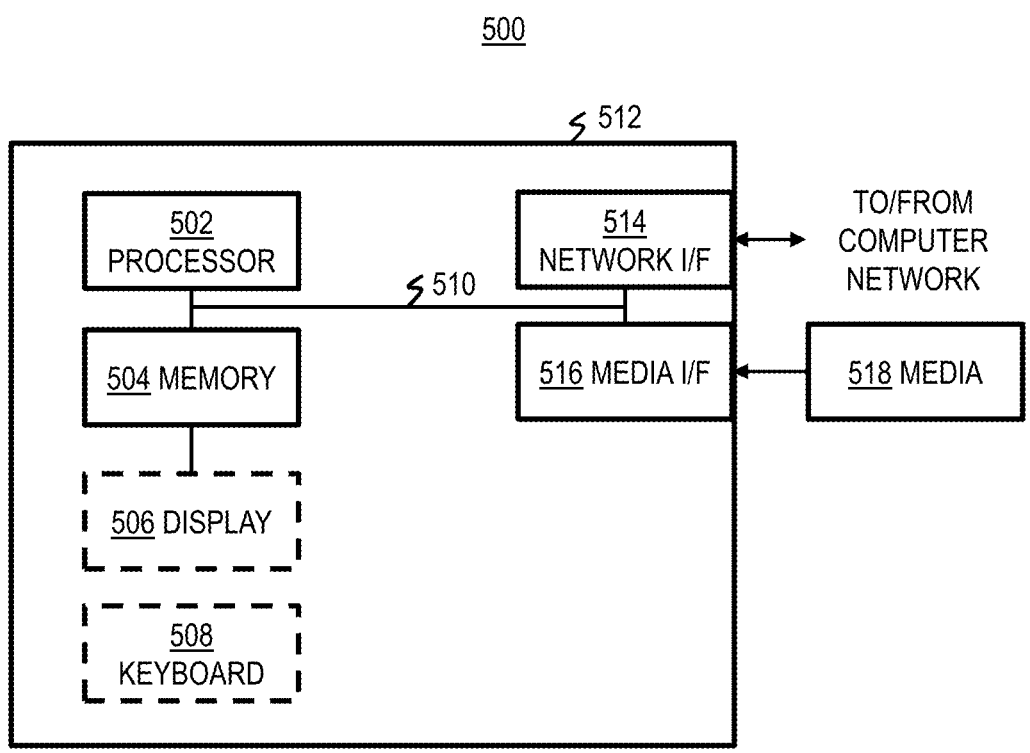
FIG. 5 shows a computer system that may be useful in implementing one or more aspects and/or elements of the invention.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for use in presenting a plurality of concepts to a plurality of students, the method comprising:
developing a first statistical model of one or more modalities effective for teaching at least a given concept of the plurality of concepts across the plurality of students;
developing a second statistical model of one or more modalities effective for learning by at least a given student of the plurality of students across the plurality of concepts;
combining the first and second models to determine one or more modalities for presenting at least the given concept to at least the given student, the determined one or more modalities being ranked in order of best modality for teaching the at least a given concept of the plurality of concepts to the at least a given student of the plurality of students; and
presenting at least the given concept to at least the given student using the determined one or more modalities,
wherein developing the first statistical model comprises maintaining a multi-dimensional matrix indicating an effectiveness of at least one of the one or more modalities for teaching the at least a given concept to the at least a given student, and aggregating the effectiveness of the at least one of the one or more modalities for teaching the at least a given student across the plurality of students.

2. The method of claim 1, further comprising:
after presenting at least the given concept to at least the given student, obtaining data regarding effectiveness of the determined one or more modalities for presenting at least the given concept to at least the given student; and
updating the first and second models based at least in part on the obtained data.

3. The method of claim 2, wherein the obtained data comprises one or more assessments of knowledge by at least the given student of at least the given concept.

4. The method of claim 2, wherein the obtained data comprises one or more assessments of progress by at least the given student in learning at least the given concept.

5. The method of claim 2, wherein the obtained data comprises data obtained by a longitudinal analysis.

6. The method of claim 2, wherein the obtained data comprises feedback from at least the given student regarding the effectiveness of the determined one or more modalities for presenting at least the given concept.

7. The method of claim 1, wherein the one or more modalities are determined based at least in part on knowledge by at least the given student of at least one background concept for at least the given concept.

8. The method of claim 7, wherein the at least one background concept for at least the given concept is provided in a cross-disciplinary concept graph.

9. The method of claim 1, wherein developing the second model comprises:
maintaining a histogram indicating an effectiveness of at least one of the one or modalities for teaching at least the given concept to at least the given student;
clustering the plurality of concepts into one or more domains; and
generating a histogram indicating the effectiveness of the one or modalities for at least the given student in at least one of the one or more domains.

10. The method of claim 1, wherein combining the first and second models comprises determining the one or more modalities based at least in part on simple to semantic matching.

11. The method of claim 10, wherein developing the first model comprise semantically standardizing at least the given concept to one or more known concepts.

12. The method of claim 11, wherein the matching comprises computing an overlap of the one or more known concepts between the first and second models.

13. The method of claim 1, wherein developing the first statistical model comprises at least one content provider iteratively generating content for at least the given concept in at least one of the one or more modalities.

14. The method of claim 13, wherein developing the first statistical model further comprises iterative tagging the content as the content is consumed by at least the given student.

15. The method of claim 13, wherein developing the second statistical model comprises the at least one content provider inputting an initial set of learner preferences.

16. The method of claim 13, wherein combining the first and second models comprises informing the at least one content provider of at least another one of the one or modalities for which the at least one content provider should generate concept for at least the given concept.

17. The method of claim 1, wherein each of the first and second models is at least one of statistically determined and statistically ratified.

18. An apparatus for use in presenting a plurality of concepts to a plurality of students, said apparatus comprising:
- a memory; and
- at least one processor coupled with the memory, the processor operative:
  - to develop a first statistical model of one or more modalities effective for teaching at least a given concept of the plurality of concepts across the plurality of students;
  - to develop a second statistical model of one or more modalities effective for learning by at least a given student of the plurality of students across the plurality of concepts;
  - to combine the first and second models to determine one or more modalities for presenting at least the given concept to at least the given student, the determined one or more modalities being ranked in order of best modality for teaching the at least a given concept of the plurality of concepts to the at least a given student of the plurality of students; and
  - to present at least the given concept to at least the given student using the determined one or more modalities,
  - wherein developing the first statistical model comprises maintaining a multi-dimensional matrix indicating an effectiveness of at least one of the one or more modalities for teaching the at least a given concept to the at least a given student; and aggregating the effectiveness of the at least one of the one or more modalities for teaching the at least a given student across the plurality of students.

19. A computer program product for use in presenting a plurality of concepts to a plurality of students, said computer program product comprising a non-transitory machine-readable storage medium having machine-readable program code embodied therewith, said machine-readable program code comprising machine-readable program code configured:
- to develop a first statistical model of one or more modalities effective for teaching at least a given concept of the plurality of concepts across the plurality of students;
- to develop a second statistical model of one or more modalities effective for learning by at least a given student of the plurality of students across the plurality of concepts;
- to combine the first and second models to determine one or more modalities for presenting at least the given concept to at least the given student, the determined one or more modalities being ranked in order of best modality for teaching the at least a given concept of the plurality of concept to the at least a given student of the plurality of students; and
- to present at least the given concept to at least the given student using the determined one or more modalities,
- wherein developing the first statistical model comprises maintaining a multi-dimensional matrix indicating an effectiveness of at least one of the one or more modalities for teaching the at least a given concept to the at least a given student; and aggregating the effectiveness of the at least one of the one or more modalities for teaching the at least a given student across the plurality of students.

\* \* \* \* \*